Patented July 15, 1941

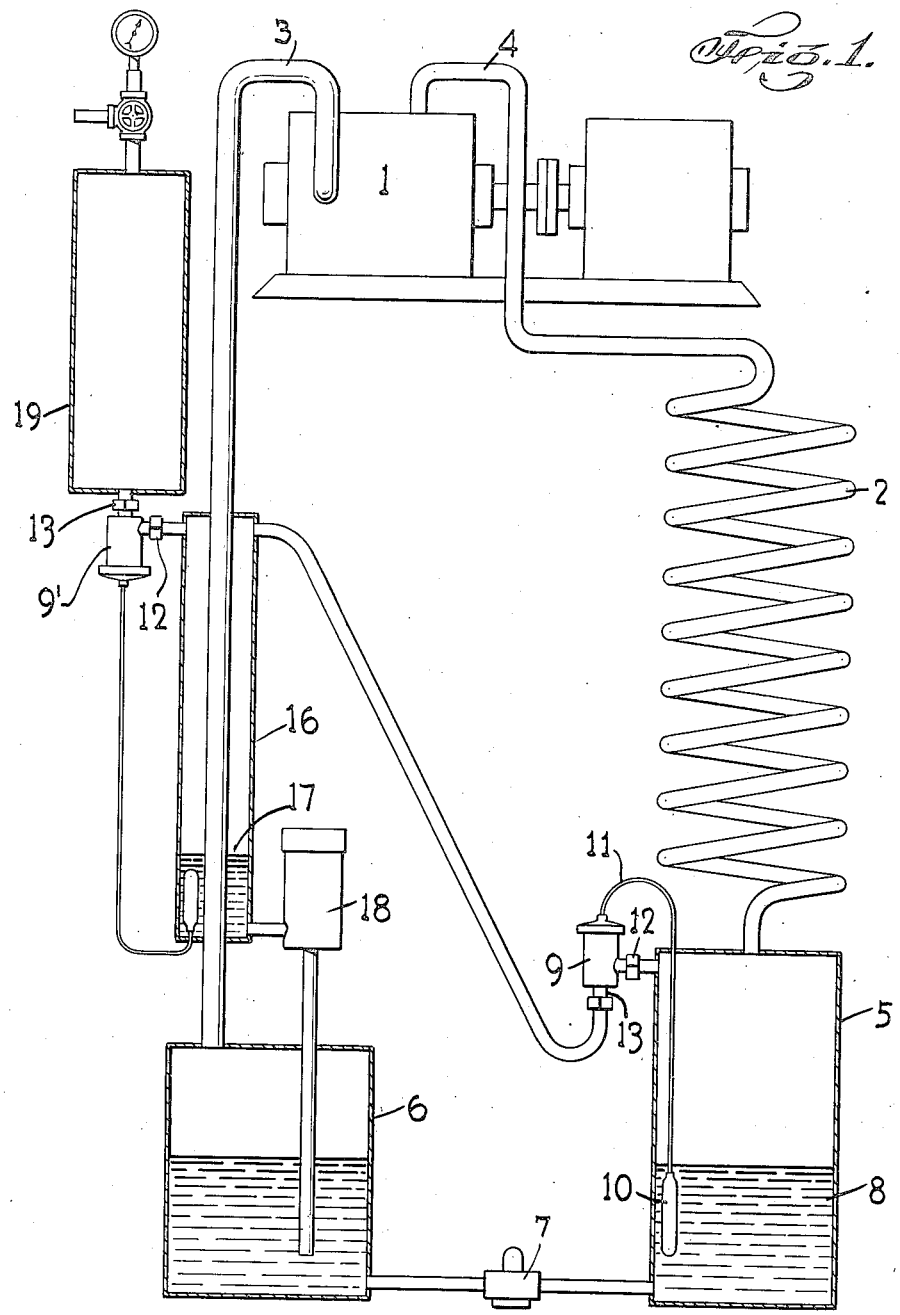

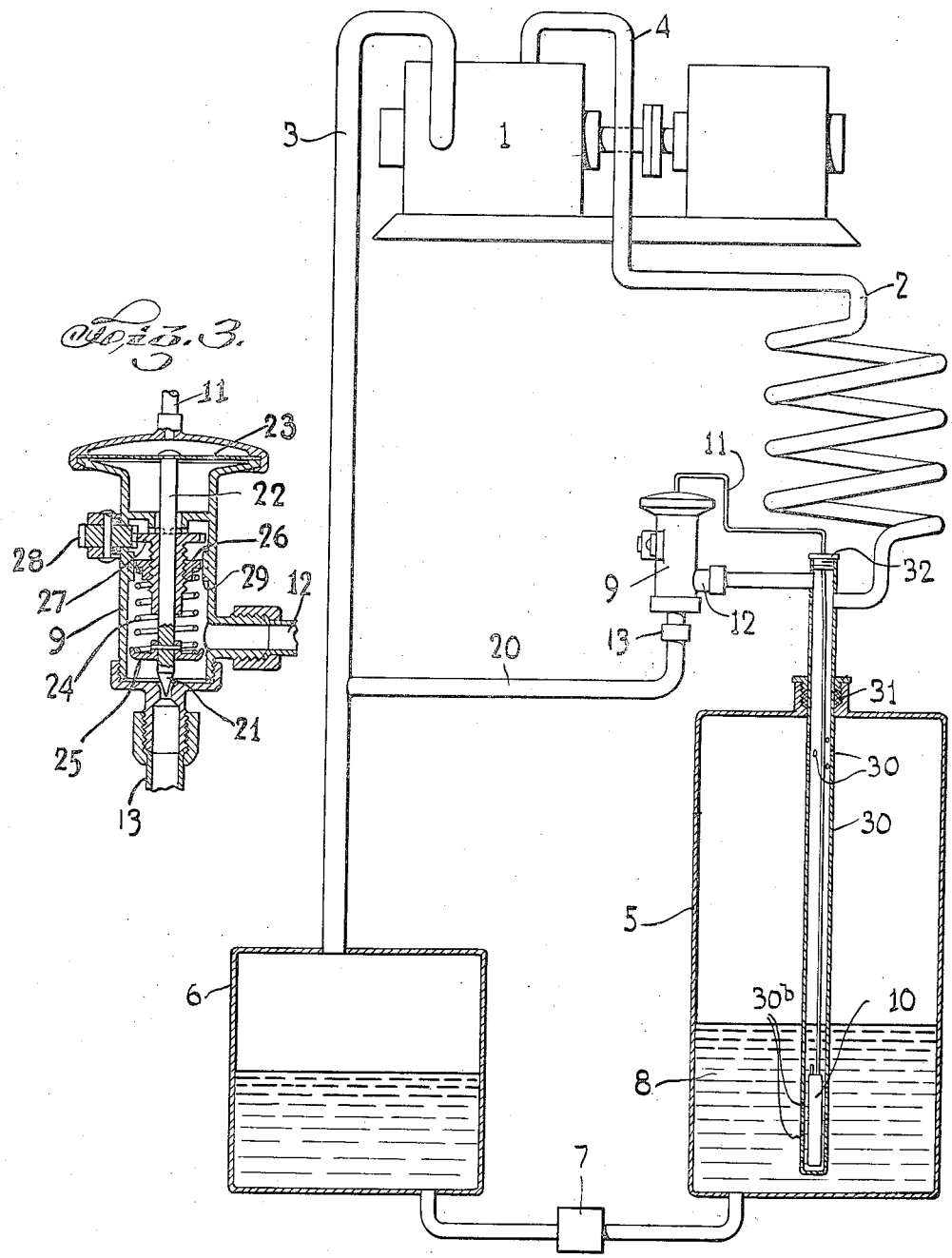

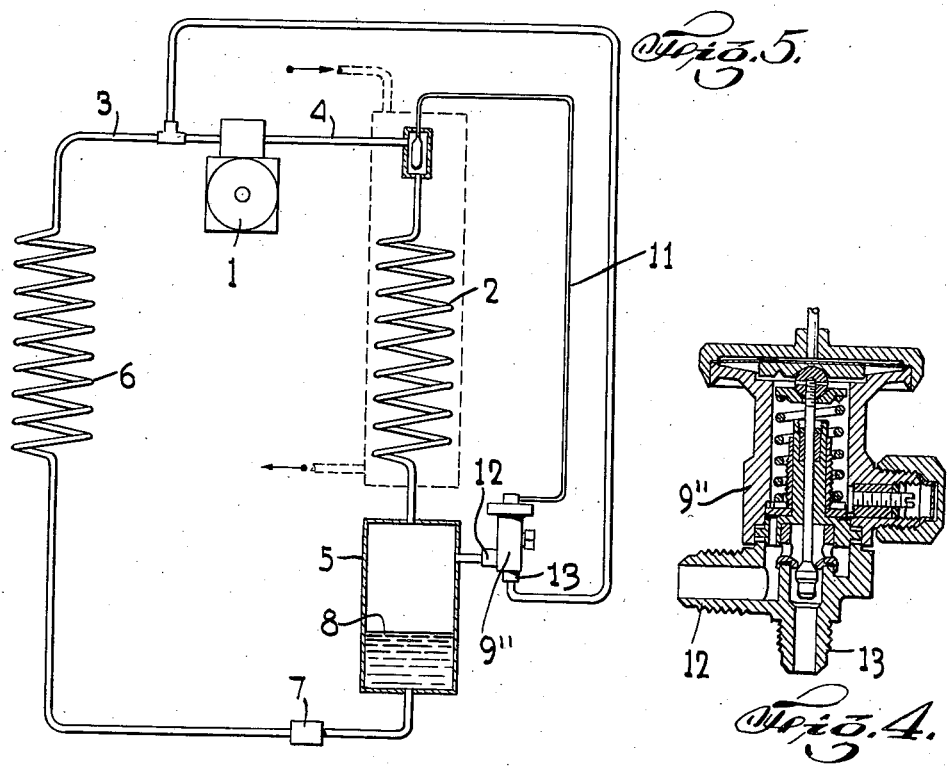
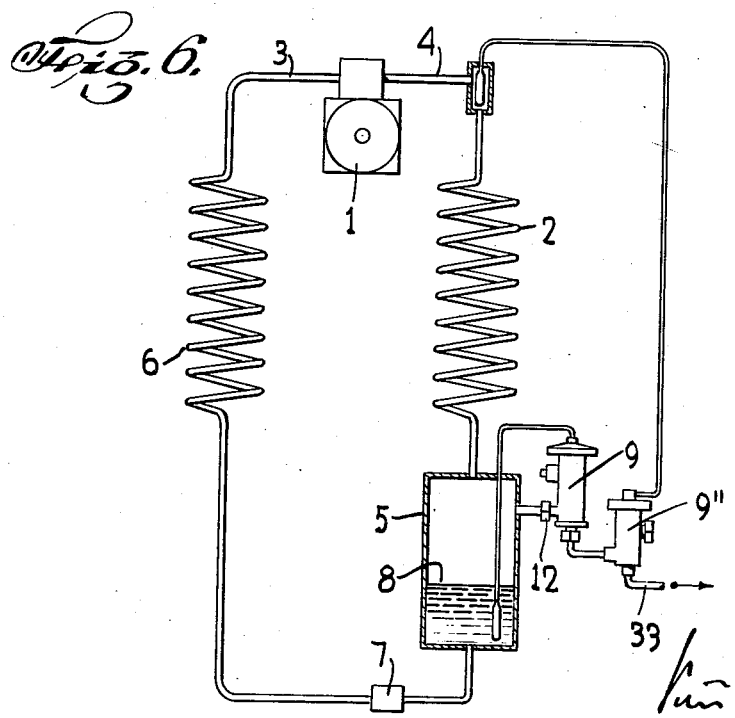

2,249,622

UNITED STATES PATENT OFFICE 2,249,622

REFRIGERATION CONDENSER CONTROL

Peter Schlumbohm, New York, N. Y.

Application April 22, 1939, Serial No. 269,383
In Germany April 22, 1938

10 Claims. (Cl. 62—170)

The invention relates to a method and to apparatus for controlling the pressure in condensers of refrigerating systems. More specifically, two factors which influence the condenser pressure shall be brought under control; first: the partial pressure of non-condensable gases which accumulate in the condenser; and second: the superheating of the vapor of the refrigerant in the condenser, especially when exceeding a normal degree, as is the case if the cooling means of the condenser break down.

The original problem, which led to the invention, was to provide a purging of the condenser from non-condensable gas. All known purging methods were based on a continuous bleeding of the condenser, assuming a steady want for the purging and in a rather constant degree. Exceptionally strong purging, as required in connection with filling operations, would be taken care of by the engineer and hand operated valves. I tried to create a purging mechanism which would operate in strict dependency of the partial pressure of the non-condensable gas. This meant measuring the partial pressure of the non-condensable gas. Most known methods were of a chemical nature, involving a chemical analysis of the gases, and this was out of the question, as the new equipment would have to be very simple.

I succeeded in finding a physical method of utilizing the partial pressures in the condenser; and this method has moreover the advantage of requiring instruments which deviate only to a small degree from standard instruments, and which can easily be manufactured by the industry without requiring a costly development work. The new method utilizes the partial pressure as a differential pressure, and this differential pressure operates a differential pressure valve which then regulates the condenser pressure.

The invention is based on the conception: to deduct from the total condenser pressure the partial pressure of the refrigerant itself, and to compute the surplus pressure as being the partial pressure of the non-condensable gases.

Following the invention, the partial pressure of the refrigerant in the condenser is reproduced in a separate space by a chemical substance which has the same thermodynamic properties as the refrigerant—for all practical purposes by the chemical compound which is used as refrigerant—by providing a good exchange of temperatures between the condenser and said separate space. I preferably employ a differential pressure valve, in which a diaphragm is exposed to two different pressures on its two sides and in which a movable valve element is operated by the diaphragm and thus by the difference of those two pressures, or other types of differential pressure valves may be used to be exposed to the total condenser pressure on the one side and to the partial pressure of the refrigerant as reproduced in said separate space on the other side. In practice this separate space is built in the form of a "thermal bulb" which is connected by a capillary tube with the space on the one side of the diaphragm in the valve body.

During the development of the invention it was found that the new principle may also be applied for controlling the superheating of the vapor of the refrigerant in the condenser, as will be explained below.

The invention is illustrated in the accompanying drawings in Figs. 1-6, diagrammatically and by way of examples.

Fig. 1 illustrates a system including a purging equipment.

Fig. 2 illustrates a system including a compression release.

Fig. 3 and Fig. 4 show different types of differential pressure valves.

Fig. 5 illustrates a superheat control.

Fig. 6 illustrates a combination between a control operated by superheat and a control operated by the partial pressure of non-condensable gas.

In Fig. 1, Fig. 2, Fig. 5 and Fig. 6 a compression circuit for a refrigerant is shown diagrammatically, involving a compressor 1 with suction tube 3 and pressure tube 4, a condenser coil 2, a receiver tank 5, an evaporator 6, and expansion valve 7 and liquid refrigerant 8.

In Fig. 1 this circuit is furthermore equipped with a differential pressure valve 9 with its thermal bulb 10, capillary tube 11, its intake 12 and its outlet 13. The bulb 10 is immersed in the liquid refrigerant 8 in the condenser to equalize the temperatures. The valve 21, as illustrated in cross-section in Fig. 3 is held closed by the spring 24, if the pressure on top of the diaphragm 23 as produced in the bulb 10 is equal to the total condenser pressure as conveyed through inlet tube 12 to the space underneath the diaphragm. These two pressures will be equal if the total condenser pressure is produced by the saturation pressure of the refrigerant 8 alone, meaning if no foreign vapor pressures are existant. The sensitivity of the control may now be regulated by the tension of the spring 24 which is adjustable by a screw 28. If this spring is set at e. g. 3 lbs., and if the working pressure in the condenser is e. g. 150 lbs., this means that the valve 9 will be opened if the partial pressure of non-condensable gas surpasses 3 lbs., corresponding to a presence of 2% of non-condensable gas computed on the gas volume of the condenser space in coil 2 and tank 5.

Opening the valve 21 and releasing the pressure of the condenser may be practiced in great variety of ways. The outlet 13 of valve 9 may lead directly into the atmosphere, or it may blow off gas into a consuming device, like the carburetor of a motor if the refrigerant 8 is suitable as fuel. Or it may blow off into an absorption device, in which the refrigerant vapor is absorbed chemically. Two ways of special interest are illustrated in Fig. 1 and Fig. 2.

In Fig. 1 the valve 9 opens and closes a pipe connection between the condenser 2, 5 and a colder condenser 16, which is cooled by the evaporating refrigerant or by the cold refrigerant vapors in the suction line 3. The purpose of this condenser 16 is to recover refrigerant from the mixture of air and vapor which has left the condenser 2, 5 through valve 9. The condensed refrigerant 17 is conducted back into the evaporator 6 by known practice, e. g. under control of a float valve 18. Controlling the pressure in this condenser 16 is another chance of applying the new invention. A second differential pressure valve 9' controls the flow from condenser 16 into a storage tank 19 to the effect that valve 9' opens only after the non-condensable gases above the refrigerant 17 reach a sufficiently high pressure. If a mixture leaves the condenser 2, 5 at a working pressure of 150 lbs., e. g. with a 4% content of non-condensable gas, corresponding to a partial pressure of 6 lbs., the valve 9' should only open after the non-condensable gas of the system has accumulated in sufficient quantity in condenser 16 to reach a partial pressure corresponding to the difference of the pressure of the condenser 2, 5 and the saturation pressure of the refrigerant 17 at the low temperature, e. g. a partial pressure of 100 lbs. Thus, the spring of such a valve 9' would have to be set to 100 lbs. and the mixture passing through valve 9' into the storage tank 19 would consist of e. g. two-thirds of non-condensable gas and one-third of refrigerant vapor. The storage tank 19 may then be evacuated from time to time. This installation is not costly and allows to purge automatically even small machines and to increase their efficiency considerably.

The arrangement in Fig. 2 is in principle the same as in Fig. 1 as far as the purging of the condenser 2, 5 is concerned. However, the mixture of gas and vapor which leaves the differential pressure valve 9 through outlet tube 13 is conducted by tube 20 to the suction line 3 of the compressor. Thus, opening valve 9 has the effect of a compression release. The loss of efficiency resulting therefrom is smaller than the loss caused by accumulating non-condensable gas in the condenser would be.

Such a compression release makes the system also more elastic against temporary disturbances. If, for instance, in water cooled condensers the water supply is shut off temporarily the condenser pressure will rise and an unusual superheating of the vapors will take place. While the liquid refrigerant 8 still keeps its previous temperature, and accordingly also the bulb 10, such a rise in the total condenser pressure will open the valve 9 like a foreign partial vapor pressure would do. In standard systems in such cases a maximum pressure safety switch will turn off the current for the motor, and the motor has later on to be started again by hand switch. With the new arrangement, the compression release allows the motor to continue running; and after the cooling water supply has been opened again, valve 9 will close and the system will take up its full load again.

Fig. 3 and Fig. 4 illustrate differential pressure valves as used preferably for this invention. While Fig. 4 shows a standard valve, which opens if the bulb pressure is larger than the refrigerant pressure plus the spring pressure, Fig. 3 illustrates a valve of my own invention, which operates in the reversed direction. The spring pressure is coupled together with the bulb pressure in the tendency of closing the valve; and the valve opens only if the refrigerant pressure is greater than the bulb pressure plus the spring pressure.

The new valve as illustrated in Fig. 3 comprises a valve needle 21 including a stem 22 connected to the diaphragm 23; a spring 24 working against a head plate 25 connected to the stem 22 and tending to press the valve needle 21 into the valve seat; a base 26 for the spring 24, the base 26 being threaded to a turnable screw 27, which again is geared to the adjusting pinion or element 28, and being centered and assisted by noses 29. Thus, the tension of the spring 24 can be adjusted by turning the screw 28.

A construction which advantageously holds the bulb 10 and the capillary tube 11 in a fixed position to the valve body 9 is shown in Fig. 2. The bulb 10 and the greatest part of the capillary tube 11 are arranged within a pipe 30, equipped with holes 30a for the passage of vapor and holes 30b for the passage of liquid refrigerant, and adapted to be inserted into the wall of the receiver tank by means of a threaded part 31 while sealing the capillary tube by means of a seal plug 32. The pipe 30 is built strong enough to be mechanically the base for valve 9, to the inlet 12 of which it is connected. Furthermore, the pipe 30 is connected to the condenser coil 2.

The system as illustrated in Fig. 5 utilizes a standard valve as shown in Fig. 4, which will open if the bulb pressure surpasses the condenser pressure plus the spring pressure. Such standard valves are used now for the purpose of controlling the feeding of the evaporator with refrigerant; the bulb is fixed at the end of the evaporator coil and the valve is kept open by superheated vapor in that zone. The valve bulb is placed following this invention at the beginning of the condenser coil to respond to superheated vapor in that zone. The ratio of superheat at which the valve 9" shall open, can be predetermined by adjusting the spring. If the spring pressure is very small, the valve 9" will open as soon as the compressor starts compressing refrigerant vapor and will close as soon as the compressor stops running.

If the valve 9" is to be used as a safety valve in case of an unusual ratio of superheat, the spring will be set accordingly and the outlet of valve 9" will then be connected with the suction side of the compressor as shown in Fig. 5. Such a compression release will work as described before, with the advantage of keeping the motor running during a temporary lack of cooling medium.

The example as illustrated in Fig. 6 shows the possibility of combining the various methods. A differential pressure valve 9 is arranged to respond to the partial pressure of non-condensable gas and is further arranged in line with a valve 9" as described in Fig. 5. Gas can leave the system through tube 33 only if both valves are open. If tube 33 leads to a device which consumes the mixture of gas and refrigerant vapor, e. g. the carburetor of a combustion engine, which drives the compressor, it then is desirable to close the line 33 if the motor and the compressor stop. As explained above, valve 9" can be adjusted to this function.

I wish to emphasize the general superiority of this new kind of control compared with maximum/minimum pressure controls or with maximum/minimum temperature controls. The new controls are independent of the temperature level, as the factor temperature works both on the refrigerant and on the bulb. Accordingly they are also independent of the pressure level. They are only influenced by the difference of two pressures. All maximum/minimum—pressure or—temperature controls require seasonal adjustments to the summer or winter working conditions, or must involve such a wide range as to include all working conditions, and will at any rate always show a large amplitude in their curves of the cut-in and the cut-out operations. The new controls as created by this invention operate with a very small amplitude and represent a great refinement in condenser pressure control.

Having now described the nature of my invention and demonstrated by examples the possibility of performing it, I wish to consider logical variations as obvious to a refrigerating engineer to be included in the scope of the following claims.

I claim:

1. The method of controlling the condenser pressure of a refrigerating system by operating a valve, comprising regulating the flow of condenser gas by a differential pressure valve system—which is actuated by the difference of the pressures in two spaces separated by a diaphragm, one of the two spaces being an enclosed space filled with a substance having substantially the same thermodynamic properties as the refrigerant used in the condenser—with its one space exposed to the pressure of the condenser while exposing said substance to the temperature of the condenser.

2. The method of reducing excess pressure in a condenser forming part of a refrigerating apparatus which includes a discharge line for releasing gas from the condenser to reduce the excess pressure and a diaphragm valve in said line actuated by the difference of the pressures exercised on each side of the diaphragm; said method including the steps of controlling said discharge line by said diaphragm valve by subjecting one side of said diaphragm to the total pressure of the fluids held within the condenser and by subjecting the other side of said diaphragm to the pressure developed by expansion of a fluid in heat exchange relation with fluid of said condenser.

3. The method of claim 2, comprising the step of establishing said differential pressure by the difference between the total condenser pressure and the partial pressure of the refrigerant.

4. In the method of claim 2, the step of reproducing the partial pressure of the refrigerant condensed in the condenser by means of a substance, having the same thermodynamic properties as the refrigerant, in a space separated from the condenser space but in heat exchange relation therewith.

5. The method of reducing excess pressure in a condenser forming part of a refrigerating apparatus which includes a discharge line for releasing gas from the condenser to reduce the excess pressure and a diaphragm valve in said line actuated by the difference of the pressures exercised on each side of the diaphragm; said method comprising the steps of controlling said discharge line by said diaphragm valve by subjecting one side of said diaphragm to the total pressure of the fluids held within said condenser and by subjecting the other side of said diaphragm to the pressure developed by expansion of a fluid in heat exchange relation with gaseous fluids of said condenser.

6. The method of reducing excess pressure in a condenser forming part of a refrigerating apparatus which includes a discharge line for releasing gas from the condenser to reduce the excess pressure and a diaphragm valve in said line actuated by the difference of the pressures exercised on each side of said diaphragm; said method comprising the steps of controlling said discharge line by said diaphragm valve by subjecting one side of the diaphragm to the total pressure of the fluids held within the condenser and by subjecting the other side of said diaphragm to the pressure developed by expansion of a fluid in heat exchange with liquid refrigerant condensed in said condenser.

7. The method of reducing excess pressure in a condenser forming part of a refrigerating apparatus which includes a discharge line for releasing gas from the condenser to reduce the excess pressure and a diaphragm valve in said line actuated by the difference of the pressures exercised on each side of said diaphragm; said method comprising the steps of controlling said discharge line by said diaphragm valve by subjecting one side of the diaphragm to the total pressure of the fluids held within said condenser and by subjecting the other side of said diaphragm to the pressure developed by expansion of a fluid in heat exchange relation with superheated vapor of refrigerant of said condenser.

8. The method of claim 6 applied to the purging of a refrigerating system from non-condensable gas accumulated in the condenser, comprising the step of conducting the mixture of refrigerant vapor and non-condensable gas from the main condenser to a colder condenser by means of said discharge line which is controlled by said differential pressure valve—opening at a chosen partial pressure of said non-condensable gas in said main condenser—and the step of removing a mixture of refrigerant vapor and non-condensable gas from said colder condenser by means of a second discharge line which is controlled by a second differential pressure valve—opening at a chosen partial pressure of said non-condensable gas in said colder condenser.

9. In the method of claim 2, the step of accumulating the mixture of refrigerant vapor and non-condensable gas removed from said condenser in a storage tank connected to said discharge line.

10. The method of claim 2 applied to operating a refrigerating system with a compressor, a high-pressure condenser side and a low-pressure evaporator side, comprising the step of connecting the high-pressure side with the low-pressure side by said discharge line, controlled by said differential pressure valve.

PETER SCHLUMBOHM.